(12) United States Patent
Yamanaka et al.

(10) Patent No.: US 11,736,202 B2
(45) Date of Patent: Aug. 22, 2023

(54) OPTICAL RECEIVER EVALUATION METHOD AND OPTICAL RECEIVER EVALUATION APPARATUS

(71) Applicant: Nippon Telegraph and Telephone Corporation, Tokyo (JP)

(72) Inventors: Shogo Yamanaka, Musashino (JP); Masanori Nakamura, Musashino (JP); Asuka Matsushita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 56 days.

(21) Appl. No.: 17/432,736

(22) PCT Filed: Mar. 6, 2020

(86) PCT No.: PCT/JP2020/009741
§ 371 (c)(1),
(2) Date: Aug. 20, 2021

(87) PCT Pub. No.: WO2020/184445
PCT Pub. Date: Sep. 17, 2020

(65) Prior Publication Data
US 2022/0140913 A1     May 5, 2022

(30) Foreign Application Priority Data
Mar. 11, 2019    (JP) .................................. 2019-043740

(51) Int. Cl.
*H04B 10/61*      (2013.01)
*H04B 10/077*    (2013.01)
*H04B 10/079*    (2013.01)

(52) U.S. Cl.
CPC ......... *H04B 10/61* (2013.01); *H04B 10/0773* (2013.01); *H04B 10/0799* (2013.01)

(58) Field of Classification Search
None
See application file for complete search history.

(56) References Cited

U.S. PATENT DOCUMENTS

2002/0130255 A1*   9/2002   Baney .................... H04B 10/07
                                                                                                         250/227.19
2010/0284702 A1*   11/2010   Malouin .............. H04B 10/671
                                                                                                         398/208

(Continued)

FOREIGN PATENT DOCUMENTS

JP        63-19487 B1     4/2018

OTHER PUBLICATIONS

Physical and Link Layer (PLL) Working Group, *Implementation Agreement for CFP2-Analogue Coherent Optics Module IA# OIF-CFP2-ACO-01.0*, Optical Internetworking Forum, Jan. 22, 2016, pp. 1-92.

*Primary Examiner* — David W Lambert
(74) *Attorney, Agent, or Firm* — Workman Nydegger

(57) ABSTRACT

There are provided an evaluation method and an evaluation device for an optical receiver capable of evaluating only a phase error between optical 90-degree hybrids with high accuracy even when there is a skew between channels in the optical receiver. In the evaluation method and the evaluation device for the optical receiver including optical 90-degree hybrids, a phase error between the optical 90-degree hybrids is calculated by calculation of decomposing a transfer function of the optical receiver into a product of matrixes to evaluate the optical receiver.

5 Claims, 4 Drawing Sheets

(56) References Cited

U.S. PATENT DOCUMENTS

| | | | |
|---|---|---|---|
| 2013/0330070 A1* | 12/2013 | Yu | H04B 10/541 |
| | | | 398/16 |
| 2016/0112138 A1* | 4/2016 | Alfiad | H04B 10/50595 |
| | | | 398/182 |
| 2017/0338893 A1* | 11/2017 | Cavaliere | H04B 10/6165 |
| 2020/0036440 A1 | 1/2020 | Yamagishi et al. | |

* cited by examiner

OPTICAL RECEIVER EVALUATION METHOD AND OPTICAL RECEIVER EVALUATION APPARATUS

TECHNICAL FIELD

The present invention relates to an optical receiver evaluation method and an optical receiver evaluation device for coherent optical communication.

BACKGROUND ART

In the related art, optical transceivers based on digital coherent technologies in which digital signal processing and coherent detection are combined have been developed.

In optical transceivers of 100 Gb/s per wavelength, a baud rate and a modulation scheme are, for example, a 32 Gbaud polarization division multiplexed-quadrature phase shift keying (PDM-QPSK). Optical transmitters generate PDM-QPSK optical signals by modulating orthogonal linearly-polarized light (X polarized waves and Y polarized waves) into baseband signals of QPSK. The optical receivers convert optical signals into baseband signals by performing coherent detection on received light and local light and reproduce transmitted data by demodulating QPSK through digital signal processing (DSP).

To increase a transmission capacity per wavelength, in optical transceivers of 400 Gb/s, a baud rate and a modulation scheme are, for example, 64 Gbaud polarization division multiplexed-16 quadrature amplitude modulation (PDM-16 QAM) or 43 Gbaud PDM-64 QAM. In this way, in future optical transceivers, an increase in a baud rate and allowing multiple values for a modulation scheme will allow an increase in a transmission capacity per wavelength.

FIG. 1 illustrates a configuration of an optical receiver 100 for digital coherent optical communication. The optical receiver 100 includes polarized wave separators (PBSRX and PBSLO), optical 90-degree hybrids (HYBX and HYBY), balanced photodiodes (PD1 to PD4), transimpedance amplifiers (TIA1 to TIA4), and A/D converters (ADC1 to ADC4) from the left received light (RX) and local light (LO) input side.

The polarized wave separators (PBSRX and PBSLO) causes separation of received light (RX) and local light (LO) for different output ports in accordance with a polarized-wave state. The optical 90-degree hybrids (HYBX and HYBY) each separate the received light and the local light of each polarized wave and cause the separated light to interfere. At this time, of the separated local light, one piece of local light gives a phase difference of 90 degrees to the other piece of local light which interferes with the received light. The interfering light of each polarized wave is converted into an electric signal by the photodiodes (PD1 to PD4) and the transimpedance amplifiers (TIA1 to TIA4) and the analog electric signal is converted into a digital signal by the A/D converters (ADC1 to ADC4).

When giving multiple values in a modulation scheme is in progress, an influence of a phase error between the optical 90-degree hybrids (a deviation from 90 degrees) on transmission characteristics is considerable. Therefore, a method of compensating for the phase error between the optical 90-degree hybrids using digital signal processing (DSP) has been proposed. For example, as disclosed in PTL 1, it is possible to compensate for a transfer function (including the phase error between the optical 90-degree hybrids) of an optical receiver using a known signal.

On the other hand, as a method of evaluating the phase error between the optical 90-degree hybrids in the related art, as illustrated in FIG. 2, there is a method of evaluating a phase error between the 90-degree hybrids using a beat frequency, as disclosed in NPL 1. In the evaluation method, two pieces of continuous waveform (CW) light CW1 (with a frequency f1) and CW2 (with a frequency f2) with different oscillating frequencies are input to an optical receiver and the phase error between the optical 90-degree hybrids can be evaluated from a phase difference between beat electric signals (a frequency of the beat electric signal corresponds to a difference between oscillating frequencies of two light sources) before A/D conversion output from a transimpedance amplifier.

Specifically, when four output channels of the transimpedance amplifier are an in-phase component (XI) of an X polarized wave, a quadrature component (XQ) of the X polarized wave, an in-phase component (YI) of a Y polarized wave, and a quadrature component (YQ) of the Y polarized wave, a phase difference between beat electric signals output from an XI channel and an XQ channel is also 90 degrees in a case in which a 90-degree hybrid phase difference between the X polarized waves is 90 degrees (an ideal case).

On the other hand, when the 90-degree hybrid phase difference between the X polarized waves deviates from 90 degrees, a phase difference between the beat electric signals output from the XI channel and the XQ channel also deviates from 90 degrees by a phased difference corresponding to the deviation. Accordingly, the phase error between the 90-degree hybrids in the X polarized wave can be evaluated from the phase difference between the beat electric signals output from the XI channel and the XQ channel. The same applies to a method of evaluating the phase error between the 90-degree hybrids in the Y polarized wave.

CITATION LIST

Patent Literature

[PTL 1] Japanese Patent No. 6319487

Non Patent Literature

[NPL 1] Implementation Agreement for CFP2-Analog Coherent Optics Module IA# OIF-CFP2-ACO-01.0

SUMMARY OF THE INVENTION

Technical Problem

In the related art, when the transfer function of the optical receiver is compensated for using a known signal, a transfer function including other imperfections (for example, a variation in a gain between channels) occurring in the optical receiver is estimated and compensated for. Accordingly, there is the problem that it is not possible simply to estimate phase error between the optical 90-degree hybrids is estimated.

The method of evaluating the phase error between the optical 90-degree hybrids using the beat frequency in the related art has the problem that the optical 90-degree hybrid phase difference cannot be evaluated with high accuracy when there is a skew between channels (a difference in a delay time) of the optical receiver. For example, when there is skew between the XI channel and the XQ channel, a phase difference in accordance with the skew may be added to the phase difference between the beat electric signals output from the XI channel and the XQ channel of the transimpedance amplifier. Accordingly, in the evaluation method using the beat frequency in the related art, the optical 90-degree hybrid phase difference and a phase difference caused due to the skew between the channels cannot be evaluated separately. Therefore, there is the problem that the phase error between the optical 90-degree hybrids cannot be evaluated with high accuracy when there is a skew between the channels in the optical receiver.

The present invention has been devised in view of the foregoing problems and an objective of the present invention is to provide an optical receiver evaluation method and an optical receiver evaluation device capable of simply evaluating a phase error between the optical 90-degree hybrids with high accuracy even when there is a skew between channels of an optical receiver.

Means for Solving the Problem

Examples of an embodiment of the present invention include the following configurations to achieve the objective.

(Configuration 1)

There is provided a method of evaluating an optical receiver including optical 90-degree hybrids. The method includes: a calculation step of decomposing a transfer function of the optical receiver into a product of matrixes; and a step of evaluating the optical receiver by calculating a phase error between the optical 90-degree hybrids by the product of the matrixes decomposed in the calculation step.

(Configuration 2)

In the method of evaluating the optical receiver in configuration 1, the calculation step of decomposing the transfer function into the product of the matrixes may be a calculation step of decomposing a matrix indicating the transfer function of the optical receiver into a product of a shear matrix, a scaling matrix, and a rotation matrix. The step of evaluating the optical receiver may be a step of obtaining the phase error between the optical 90-degree hybrids of the optical receiver from a coefficient of the shear matrix.

(Configuration 3)

In the method of evaluating the optical receiver in configuration 2, the shear matrix may be obtained by decomposing the matrix indicating the transfer function of the optical receiver into a product of a rotation matrix and an upper triangular matrix by QR decomposition and decomposing the upper triangular matrix into a product of the shear matrix and the scaling matrix.

(Configuration 4)

There is provided a device that evaluates an optical receiver including optical 90-degree hybrids and includes: a transmission unit and a reception unit connected via a transmission path. The transmission unit includes a known signal generation unit that generates a series of known signals, an optical transmitter, and a transmitter compensation unit that acquires an estimation result of a transfer function of the optical transmitter from a transmitter transfer function estimation unit of the reception unit and compensates for the transfer function of the optical transmitter. The reception unit includes an optical receiver, a receiver compensation unit, first receiver transfer function estimation unit, second receiver transfer function estimation unit, and the transmitter transfer function estimation unit. An estimated transfer function of the optical receiver is decomposed into terms of a phase error between the 90-degree hybrids, a gain imbalance between channels, and remaining rotation and the optical receiver is evaluated.

(Configuration 5)

In the device that evaluates the optical receiver in configuration 4, the transmitter transfer function estimation unit may estimate the transfer function of the optical transmitter from a provisional transfer function of the optical receiver and first digital data acquired by the reception unit when a first known signal is transmitted from the transmission unit to the reception unit. The first receiver transfer function estimation unit may estimate the provisional transfer function of the optical receiver from digital data acquired by the reception unit when an ASE signal is input to an input end of the optical receiver. The second receiver transfer function estimation unit may estimate the transfer function of the optical receiver from the estimated transfer function of the optical transmitter and second digital data acquired by the reception unit when a second known signal is transmitted from the transmission unit to the reception unit.

Effects of the Invention

According to the present invention, it is possible to provide an optical receiver evaluation method and an optical receiver evaluation device capable of evaluating only a phase error between the optical 90-degree hybrids with high accuracy even when there is a skew between channels of an optical receiver.

DESCRIPTION OF EMBODIMENTS

Hereinafter, an embodiment of the present invention will be described in detail with reference to the drawings.

Embodiment

Figure 3:
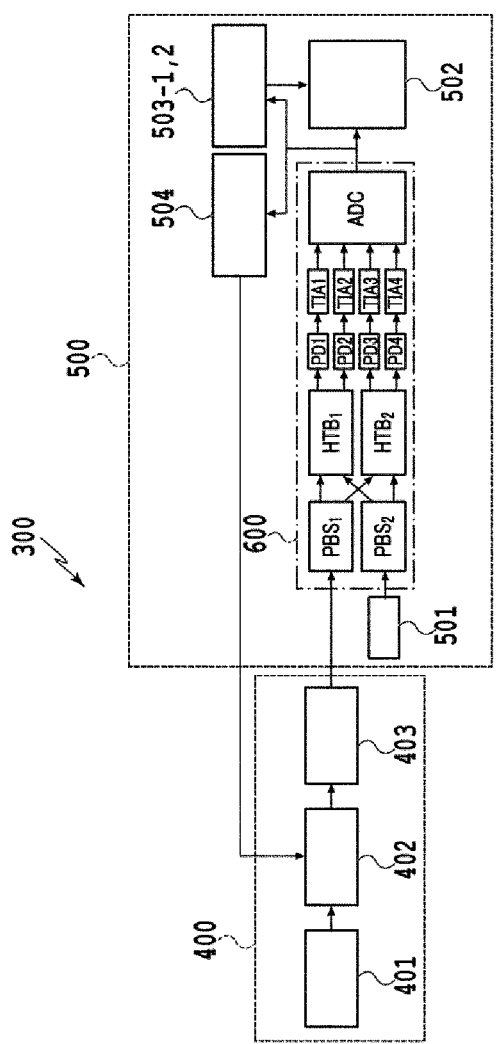
FIG. 3 is a diagram illustrating an optical receiver evaluation device according to an embodiment of the present invention.

FIG. 3 is a diagram illustrating an optical receiver evaluation device 300 according to an embodiment of the present invention. A transmission unit 400 of the evaluation device 300 transmits an optical signal to a reception unit 500 via an optical fiber or the like.

The transmission unit 400 includes a known signal generation unit 401, a transmitter compensation unit 402, and an optical transmitter 403. The known signal generation unit 401 generates a series of known signals for each of XI, XQ, YI, and YQ channels and transmits the series of the known signals to the transmitter compensation unit 402. The series of the known signals are shared between the transmission unit 400 and the reception unit 500.

The transmitter compensation unit 402 acquires an estimation result of a transfer function of the optical transmitter 403 from a transmitter transfer function estimation unit 504 of the reception unit 500. The transmitter compensation unit 402 compensates for the transfer function of the optical transmitter 403 based on the estimation result.

The optical transmitter 403 generates an optical signal by modulating linearly polarized light orthogonal to the series of the known signal output from the transmitter compensation unit 402. The generated optical signal is supplied to the reception unit 500 via an optical transmission path.

The reception unit 500 includes an optical receiver 600, a receiver compensation unit 502, a first receiver transfer function estimation unit 503-1, a second receiver transfer function estimation unit 503-2, and a local laser diode (LD) 501.

Figure 1:
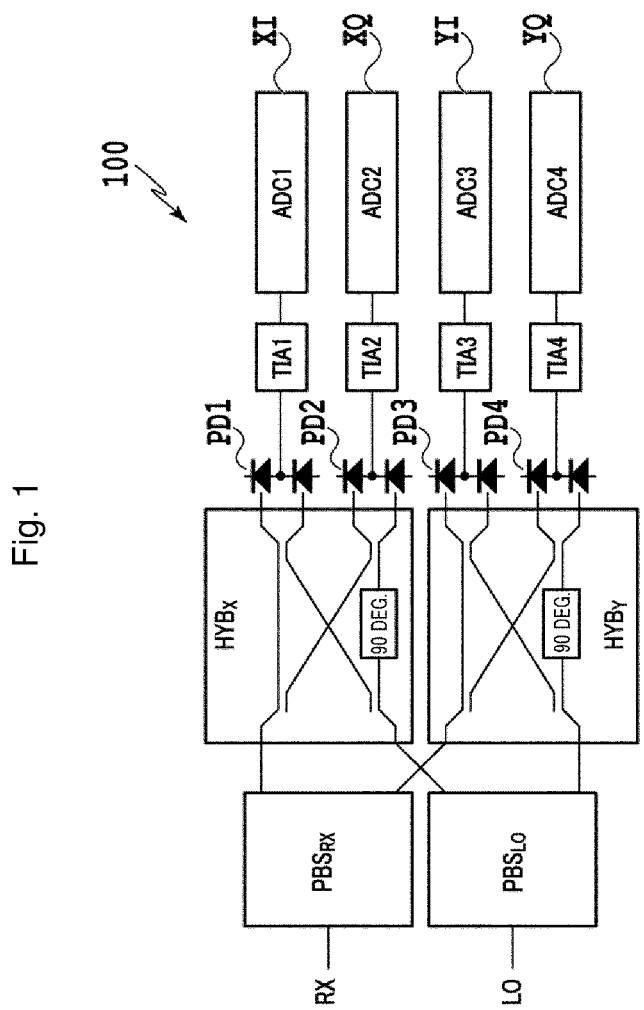
FIG. 1 is a diagram illustrating a configuration of an optical receiver in the related art.
Figure 2:
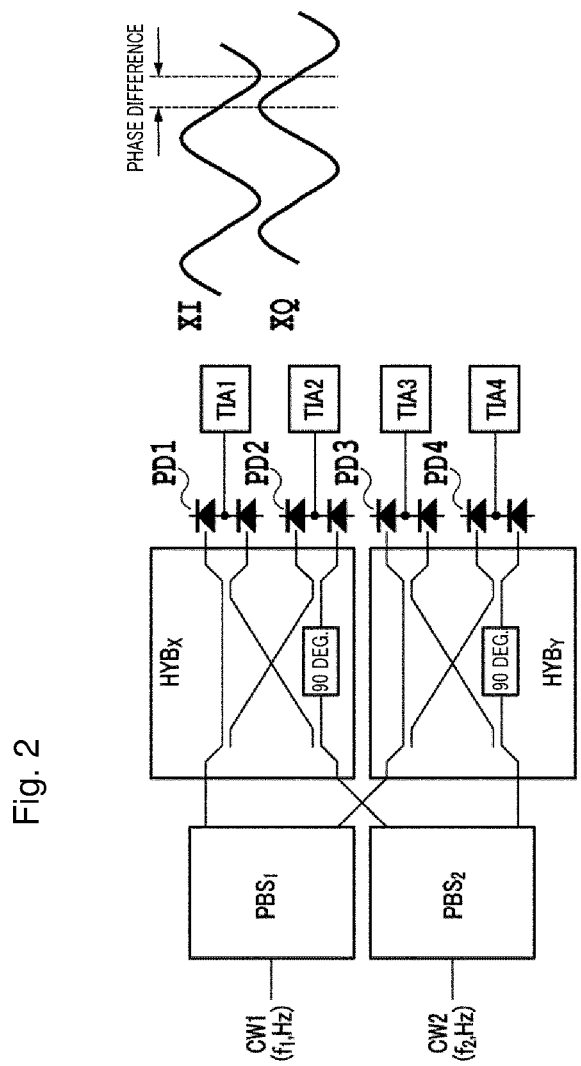
FIG. 2 is a diagram illustrating a method of evaluating a phase error between optical 90-degree hybrids using a beat frequency in the related art.

The optical receiver 600 which is an evaluation target includes polarized wave separators (PBS1 and PBS2), optical 90-degree hybrids (HYB1 and HYB2), photodiodes (PD1 to PD4), transimpedance amplifiers (TIA1 to TIA4), and an A/D converter (ADC), as in FIG. 1.

The polarized wave separators (PBS1 and PBS2) separate received light and local light output from the local LD to different output ports in accordance with a polarized-wave state. The optical 90-degree hybrids (HYB1 and HYB2) each separate the received light and the local light of each polarized wave and cause the separated light to interfere. At this time, of the separated local light, one piece of local light gives a phase difference of 90 degrees to the other piece of local light which interferes with the received light. The interfering light of each polarized wave is converted into an electric signal by the photodiodes (PD1 to PD4) and the transimpedance amplifiers (TIA1 to TIA4) and the analog electric signal is converted into a digital signal by the A/D converter (ADC).

The receiver compensation unit 502 acquires a digital output of the optical receiver 600 from the optical receiver 600, acquires an estimation result of the transfer function of the optical receiver 600 from the second receiver transfer function estimation unit 503-2, and compensates for the transfer function of the optical receiver 600 based on the estimation result.

The first receiver transfer function estimation unit 503-1 estimates a provisional transfer function of the optical receiver 600 from the digital data acquired by the reception unit 500. Here, the digital data is assumed to be acquired when an amplified spontaneous emission (ASE) signal corresponding to white noise is input to an input end of the optical receiver 600. The ASE signal can be generated from an optical amplifier. The optical amplifier may be included in a transmission path (an optical fiber) or a separate optical amplifier may be prepared.

The transmitter transfer function estimation unit 504 estimates the transfer function of the optical transmitter 403 from the provisional transfer function of the optical receiver 600 and first digital data acquired by the reception unit when a first known signal is transmitted from the transmission unit 400 to the reception unit 500.

The second receiver transfer function estimation unit 503-2 estimates the transfer function of the optical receiver 600 from the estimated transfer function of the optical transmitter 403 and second digital data acquired by the reception unit 500 when a second known signal is transmitted from the transmission unit 400 to the reception unit 500.

Figure 4:
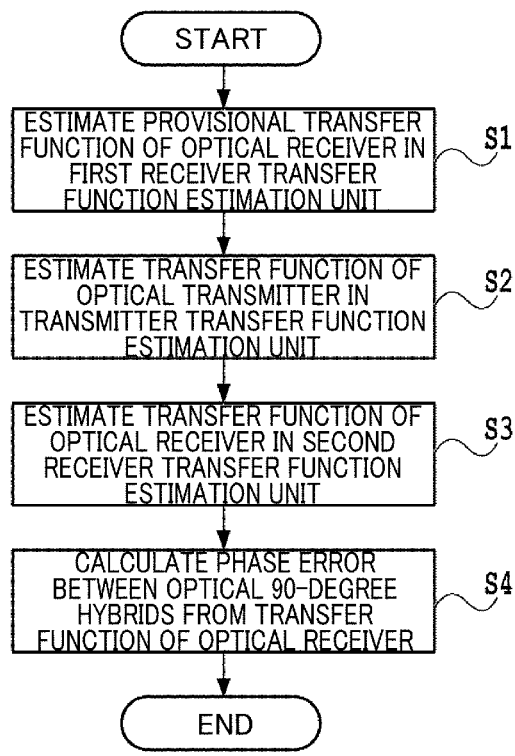
FIG. 4 is a flowchart illustrating an optical receiver evaluation method according to the embodiment of the present invention.

FIG. 4 is a flowchart illustrating an optical receiver evaluation method according to the embodiment of the present invention.

(Step S1) First, the first receiver transfer function estimation unit 503-1 estimates the provisional transfer function of the optical receiver 600.

(Step S2) Subsequently, the transmitter transfer function estimation unit 504 estimates the transfer function of the optical transmitter 403.

(Step S3) Subsequently, the second receiver transfer function estimation unit 503-2 estimates the transfer function of the optical receiver 600. In contrast, the foregoing description is the same as that of the technology of the related art. In the invention of the present specification, the following point differs from the flowchart described in PTL 1. That is, there is the difference in that the transfer function of the receiver estimated in step S3 is decomposed into terms of a phase error between the 90-degree hybrids, a gain imbalance between channels, and remaining rotation, and the optical receiver is evaluated in step S4. The detailed operations from steps S1 to S3 are similar to those of PTL 1 and detailed description will be omitted.

(Step S4) The detailed content of step S4 will be described. As an estimation result of the transfer function of the optical receiver in step S3, the transfer function is expressed in a 2×2 matrix in Expressions 1 and 2.

Math. 1

$$\begin{bmatrix} XI_{out} \\ XQ_{out} \end{bmatrix} = \begin{bmatrix} h_{X-II} & h_{X-IQ} \\ h_{X-QI} & h_{X-QQ} \end{bmatrix} \begin{bmatrix} XI_{in} \\ XQ_{in} \end{bmatrix} \quad \text{(Expression 1)}$$

Math. 2

$$\begin{bmatrix} YI_{out} \\ YQ_{out} \end{bmatrix} = \begin{bmatrix} h_{Y-II} & h_{Y-IQ} \\ h_{Y-QI} & h_{Y-QQ} \end{bmatrix} \begin{bmatrix} YI_{in} \\ YQ_{in} \end{bmatrix} \quad \text{(Expression 2)}$$

A 2×2 matrix in Expression 1 indicates a transfer function of an X polarized wave side of the optical receiver 600 and a 2×2 matrix in Expression 2 indicates a transfer function of a Y polarized wave side of the optical receiver 600. The 2×2 matrix indicating the transfer function of the X polarized wave side of the optical receiver 600 is a product of a phase error between the 90-degree hybrids of the X polarized wave side, a gain error between the XI channel and the XQ channel, and various transmission characteristic compensation errors occurring in step S3. The same applies to a 2×2 matrix indicating the transfer function on the Y polarized wave of the optical receiver 600.

An objective of step S4 is to obtain a matrix indicating a phase error between the optical 90-degree hybrids from the 2×2 matrixes. Hereinafter, a method of obtaining the phase error between the optical 90-degree hybrids on the X polarized wave side from the 2×2 matrix indicating the transfer function on the X polarized wave of the optical receiver 600 will be described.

The matrix indicating the phase error between the optical 90-degree hybrids on the X polarized wave side is expressed in a shear matrix of Expression 3.

Math. 3

$$\begin{bmatrix} 1 & \delta_X/2 \\ 0 & 1 \end{bmatrix} \quad \text{(Expression 3)}$$

Here, $\delta_X/2$ is a phase error between the optical 90-degree hybrids.

A matrix indicating a gain error between the XI channel and the XQ channel is expressed as a scaling matrix of Expression 4.

Math. 4

$$\begin{bmatrix} g_{XI} & 0 \\ 0 & g_{XQ} \end{bmatrix} \quad \text{(Expression 4)}$$

Here, $g_{XI}$ is a gain of the XI channel, $g_{XQ}$ is a gain of the XQ channel, and a ratio between the gains indicates a gain error between the channels.

The various transmission characteristic compensation errors occurring in step S3 are expressed in a rotation matrix of Expression 5.

Math. 5

$$\begin{bmatrix} \cos\theta_X & -\sin\theta_X \\ \sin\theta_X & \cos\theta_X \end{bmatrix} \quad \text{(Expression 5)}$$

Here, $\theta_X$ is a rotation angle.

Accordingly, the phase error between the optical 90-degree hybrids on the X polarized wave side can be calculated by expressing the matrix of Expression 1 as a product of Expressions 3, 4, and 5 and obtaining a matrix indicating the phase error between the optical 90-degree hybrids on the X polarized wave side.

Therefore, the 2×2 matrix of Expression 1 is first decomposed into a product of a rotation matrix and an upper triangular matrix by QR decomposition. Then, the 2×2 matrix of Expression 1 is expressed as in Expression 6.

Math. 6

$$\begin{bmatrix} h_{X-II} & h_{X-IQ} \\ h_{X-QI} & h_{X-QQ} \end{bmatrix} = \begin{bmatrix} a & b \\ 0 & c \end{bmatrix} \begin{bmatrix} \cos\theta & -\sin\theta \\ \sin\theta & \cos\theta \end{bmatrix} \quad \text{(Expression 6)}$$

Subsequently, the upper triangular matrix of Expression 6 is decomposed as in Expression 7 so that the 2×2 matrix can be decomposed into a product of Expressions 3, 4, and 5.

Math. 7

$$\begin{bmatrix} h_{X-II} & h_{X-IQ} \\ h_{X-QI} & h_{X-QQ} \end{bmatrix} = \begin{bmatrix} a & b \\ 0 & c \end{bmatrix} \quad \text{(Expression 7)}$$

$$\begin{bmatrix} \cos\theta & -\sin\theta \\ \sin\theta & \cos\theta \end{bmatrix} = \begin{bmatrix} a & 0 \\ 0 & c \end{bmatrix} \begin{bmatrix} 1 & b/a \\ 0 & 1 \end{bmatrix} \begin{bmatrix} \cos\theta & -\sin\theta \\ \sin\theta & \cos\theta \end{bmatrix}$$

Accordingly, the phase error between the optical 90-degree hybrids on the X polarized wave side can be calculated by obtaining an arc tangent of b/a obtained in Expression 7. Thus, it is possible to evaluate the optical receiver based on the phase error.

INDUSTRIAL APPLICABILITY

According to the present invention, as described above, it is possible to provide an optical receiver evaluation method and an optical receiver evaluation device capable of evaluating only a phase error between optical 90-degree hybrids with high accuracy even when there is a skew between channels of an optical receiver.

REFERENCE SIGNS LIST

100 Optical receiver
300 Evaluation device
400 Transmission unit
401 Known signal generation unit
402 Transmitter compensation unit
403 Optical transmitter
500 Reception unit
501 Local LD
502 Receiver compensation unit
503-1 First receiver transfer function estimation unit
503-2 Second receiver transfer function estimation unit
504 Transmitter transfer function estimation unit
600 Optical receiver

The invention claimed is:

1. A method of evaluating an optical receiver including optical 90-degree hybrids, the method comprising:
  decomposing a transfer function of the optical receiver into a product of matrixes; and
  evaluating the optical receiver by calculating a phase error between the optical 90-degree hybrids by the product of the matrixes.

2. The method of evaluating the optical receiver according to claim 1, wherein decomposing the transfer function into the product of the matrixes comprises decomposing a matrix indicating the transfer function of the optical receiver into a product of a shear matrix, a scaling matrix, and a rotation matrix, and wherein evaluating the optical receiver comprises obtaining the phase error between the optical 90-degree hybrids of the optical receiver from a coefficient of the shear matrix.

3. The method of evaluating the optical receiver according to claim 2, wherein the shear matrix is obtained by decomposing the matrix indicating the transfer function of the optical receiver into a product of a rotation matrix and an upper triangular matrix by QR decomposition and decomposing the upper triangular matrix into a product of the shear matrix and the scaling matrix.

4. An evaluation device that evaluates an optical receiver including optical 90-degree hybrids, the evaluation device comprising:
  a processor,
  non-transitory computer readable medium having stored thereon executable code that is executable by the processor,
  a transmission unit and a reception unit connected via a transmission path,
  wherein the transmission unit includes a known signal generator that generates a series of known signals, an optical transmitter, and, when executed by the processor, the executable code causes the processor to function as a transmitter compensation unit that acquires an estimation result of a transfer function of the optical transmitter from a transmitter transfer function estimation unit of the reception unit and compensates for the transfer function of the optical transmitter,
  wherein the reception unit includes an optical receiver, and, when executed by the processor, the executable code causes the processor to function as a receiver compensation unit, first receiver transfer function estimation unit, second receiver transfer function estimation unit, and the transmitter transfer function estimation unit,
  wherein an estimated transfer function of the optical receiver is decomposed by the evaluation device into terms of a phase error between the 90-degree hybrids, a gain imbalance between channels, and remaining rotation, and wherein the optical receiver is evaluated.

5. The evaluation device that evaluates the optical receiver according to claim 4, wherein the transmitter transfer function estimation unit estimates the transfer function of the optical transmitter from a provisional transfer function of the optical receiver and first digital data acquired by the reception unit when a first known signal is transmitted from the transmission unit to the reception unit, wherein the first receiver transfer function estimation unit estimates the provisional transfer function of the optical receiver from digital data acquired by the reception unit when an Amplified Spontaneous Emission (ASE) signal is input to an input end of the optical receiver, and wherein the second receiver transfer function estimation unit estimates the transfer function of the optical receiver from the estimated transfer function of the optical transmitter and second digital data acquired by the reception unit when a second known signal is transmitted from the transmission unit to the reception unit.

* * * * *